United States Patent [19]

Kirbach et al.

[11] Patent Number: 4,854,207
[45] Date of Patent: Aug. 8, 1989

[54] CIRCULAR SAW BLADE GUIDE AND VIBRATION DAMPER

[75] Inventors: Eberhard Kirbach, Richmond; David A. Sykes, Vancouver, both of Canada

[73] Assignee: Forintek Canada Corp., Vancouver, Canada

[21] Appl. No.: 143,190

[22] Filed: Jan. 13, 1988

[51] Int. Cl.$^4$ .............................. B26D 5/00; B26B 7/00
[52] U.S. Cl. .................................. 83/823; 30/273; 83/828
[58] Field of Search ................. 83/820, 821, 822, 823, 83/827, 828; 30/166 R, 369, 373, 374, 375, 376, 179

[56] References Cited

U.S. PATENT DOCUMENTS

| | | |
|---|---|---|
| 3,772,956 | 11/1973 | McMillan ........................... 83/821 |
| 3,878,744 | 4/1975 | Luxnat .............................. 83/821 |
| 3,918,334 | 11/1975 | Wilcox .............................. 83/821 |
| 4,136,590 | 1/1979 | Kordyban et al. ................. 83/821 |
| 4,317,400 | 3/1982 | Matchette ......................... 83/821 |
| 4,323,145 | 4/1982 | Allen ................................ 83/821 |

*Primary Examiner*—Frank T. Yost
*Assistant Examiner*—Paul M. Heyrana
*Attorney, Agent, or Firm*—Shlesinger & Myers

[57] ABSTRACT

Disclosed is a power driven circular saw blade and a guide assembly for such blade where the guide assembly includes a pair of guide units mounted respectively one of each of opposite side of the blade. Each guide unit includes a guide housing with a guide block reciprocally mounted therein and having a saw blade engaging portion. A stop limits movement of the guide block at least in a direction of movement toward the blade so that the guide block is normally in non-engagement with the saw blade while the latter is in a smooth substantially vibration free running condition. The guide block is resiliently biasing against such stop preferably by pneumatic pressure. A guide assembly as described is preferably located at the outfeed side of the blade but there may be an assembly at both the infeed and outfeed sides of the blade. The position of the stop if preferably adjustable.

6 Claims, 2 Drawing Sheets

CIRCULAR SAW BLADE GUIDE AND VIBRATION DAMPER

FIELD OF INVENTION

This invention relates generally to improvements in saw guides for circular saws in a lumber saw mill.

BACKGROUND OF INVENTION

Lumber saw mills conventionally employ band saws or circular saws in gangs for cutting logs into rough lumber and in each instance blade guides have been developed to improve the precision of cut. The present invention is concerned with an improved saw balde guide and, as disclosed, is particularly intended for use with circular saw blades, but need not be so limited. Adaptability of the guide, proposed herein for circular saws for use with other types of cutting blades will be obvious to those skilled in the art.

The cutting performance of circular saws has been substantially improved in recent years due to splined arbors, improved wear resistance of the saw teeth, and most important, due to guiding the saws. On the average, kerf reductions of more than 0.070 in. have been achieved in many of the progressive mills and sawing accuracy can be expected to be improved by at least 0.020 in. In addition, surface roughness has been reduced significantly.

With the exception of one recently introduced guide system—known as Flotex TM guide—all guide systems involve one pair of guide blocks. The use of two or three pairs at various locations around the saw blade has been studied theoretically and was found to substantially improve the stability of the saw blade. But the application of several guide pairs generally fail due to the fact that mounting of all guide blocks is stationary and rigid. It is not surprising that double or triple or even large guide plates covering up to half the blade failed. The alignment of these guide systems has to be very precise and the required pecision can not be achieved or maintained in sawmill operations. To obtain the benefits of a double guide system —which is much reduced vibration and, in turn, a much smoother cut—a Swedish company introduced the Flotex TM guide system mentioned earlier.

The Flotex TM system uses two pairs of guides one being a standard guide pair placed in a stationary position below the cut and the other a freely floating guide pair on the back guide of the saw blade below the work piece. The stationary guide controls the position of the saw blade and sawing deviations, and the floating guide functions as a vibration dampener with the result that the non-cutting side of the saw blade in contact with the work piece does not increase kerf or surface roughness. The increase in surface roughness due to contact on the non-cutting side is a more common problem, particularly in the thinner saws.

Saw blade guides can be fixed in position, or they can be mounted to float laterally as has been disclosed in German Pat. No. 3,419,220, published Nov. 29, 1984.

A principal disadvantage to fixedly located guides is that the alignment must be very precise and the required precision cannot normally be achieved or maintained in saw mill day-to-day operations. The floating guide block as in the Flotex TM system imposes substantial lateral forces on the saw blade to the extent that it precludes the use of or at the very minimum is unsatisfactory for use with thin blades. Also, because of the mass involved the recovery time is long. The floating guide block works satisfactorily with thick saw blades but are considered unsatisfactory with thin saw blades. To give an indication of what is meant "thin saw blades" have a thickness generally in the range of 0.04 inches to 0.070 inches and have a kerf of roughly 0.08 inches to 0.120 inches. These thin saw blades require less power than the conventional thicker blade, but they can be more susceptible to vibration and deflection during cutting and thus can result in rougher cuts.

SUMMARY OF INVENTION

A principal objection of the present invention is to provide a saw blade guide and damper unit so as to reduce blade vibration and in turn provide a smoother cut as well as reduce noise.

A further principal object of the present invention is to provide a saw blade guide that has little movable mass and thus a short recovery response time after being moved by engagement with the blade.

A further principal object of the present invention is to provide a guide system for a saw blade that can be readily and quickly adjusted and normally set so as to be in non-contact with the blade except upon deflection of the blade. In accordance with the present invention, in a sawing system that includes at least one movable saw blade there is provided a guide assembly for said blade comprising a guide unit mounted adjacent each of opposite faces of said blade, each said guide unit including:

(a) a guide block having a face engagable with a side face of the blade;
(b) a guide housing having the guide block reciprocally mounted thereon;
(c) means resiliently urging said guide block on said housing in a direction toward a side face of the saw blade, and
(d) means limiting reciprocal movement of said guide block in at least one direction of its reciprocal movement.

LIST OF DRAWINGS

The invention is illustrated by way of example with reference to the accompanying drawings, wherein.

DESCRIPTION OF PREFERRED EMBODIMENTS

Figure 1:
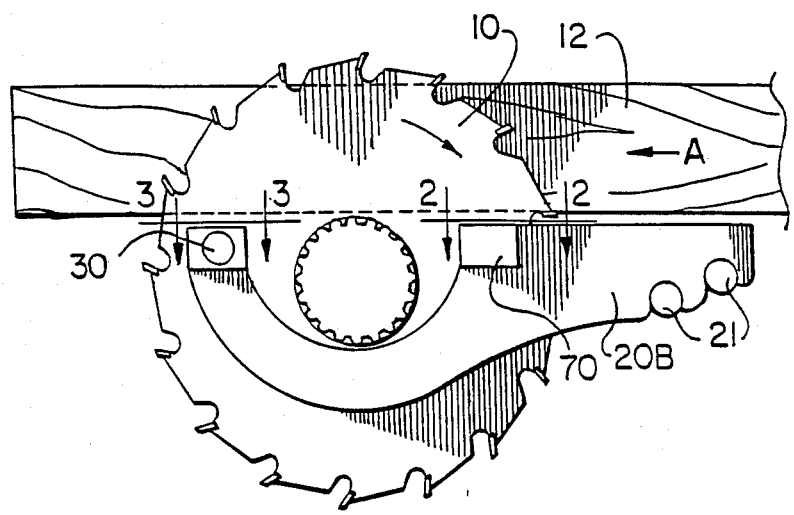
FIG. 1 is a side elevational view of the saw blade guide provided in accordance with the present invention.
Figure 2:
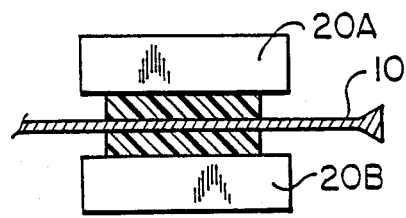
FIG. 2 is a partial sectional view along line 2—2 of FIG. 1.

Illustrated in FIG. 1 is only one of a multiplicity of saw blades 10 mounted on a common mandrel 11 in a conventional manner, and adjustable as is well known in the saw mill art. A log or other workpiece 12, during cutting, moves to the left as viewed in FIG. 1 and indicated by the arrow A. Each blade 10 is located between a pair of guide arms 20A, 20B carried by guide arm supports 21 and which are mounted in any convenient manner so as to be movable with the blade when the blade is moved longitudinally along the mandrel 11. The particular mounting arrangement for the arms and the construction of the arms and the position of the arms is not part of the present invention other than illustrative of some means for supporting a new blade guide and damping device at least at the trailing end of the blade. Similar blade guides and damping devices can also be mounted on the arm of the infeed side of the blade if desired. The trailing, or rear guide as it is also referred to, is in reference to the direction of travel of the workpiece relative to the blade i.e. the outfeed side.

Each guide arm 20A and 20B has a rear guide unit 30 mounted thereon and thus there is located one such unit on each of opposite sides of the blade. The pair of such units is referred to herein as a rear guide assembly and each guide unit 30 in that assembly has a saw blade engaging guide block 31 reciprocally mounted in a guide housing 32A and 32B (and the arm 20A and 20B) and spring biased in a direction toward the face of the blade by a spring means 33. The spring means 33 may be pneumatic, mechanical and/or hydraulic, pneumatic being preferred because of the quicker response time.

The guide housing 32A and 32B is detachably mounted in any convenient manner on the guide arm 20A and 20B associated therewith and may be adjustably mounted to facilitate quick rough alignment. The guide system is shown in its simplest form in FIG. 3 and in the preferred form each guide block 31 is attached to a tether line 34 so as to provide a stop limiting movement of the guide block in a direction towards the blade. The tether line 34 preferably is adjustable so that the guide block position can be adjusted to be in noncontact with the blade when the blade is in a normal smooth running position. Diagrammatically, the adjustment is designated by a block designated 35.

Figure 3:
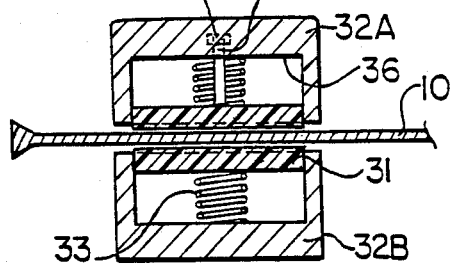
FIG. 3 is a partial cross-sectional view along line 3—3 of FIG. 1.

In the embodiment illustrated in FIG. 3, the guide block 31 is not limited in its movement in the opposite direction, but could be if desired, by engagement with the face designated 36 of the guide housing.

Figure 4:
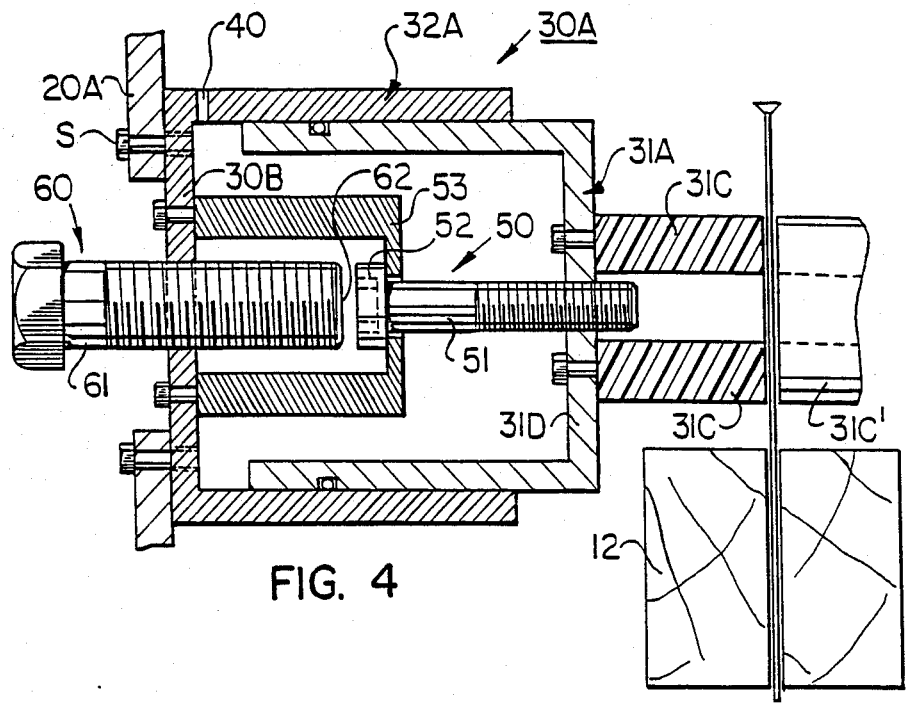
FIG. 4 is a partial enlarged sectional view of an adjustable vibration damper and blade guide provided in accordance with the present invention.

As previously indicated, the spring means designated 33 may be a comprssion coil spring, i.e. mechanical or it may be a pneumatic and/or hydraulic system. FIG. 4 illustrates, in cross-sectional view, a pneumatic guide block and damper unit 30A as a replacement for the guide unit 30 of FIG. 3. The guide unit 30A consists of a guide block 31A reciprocally mounted in a guide housing 32A the latter being detachably mounted on arm or mounting frame 20A as by a plurality of studs S. The guide block 31A, in this instance, is a piston reciprocally mounted in a cylindrical housing 32A with escape of air between the two being prevented by at least one of close tolerance, an oil film or one or more O-ring seals OS. A groove for the seal may be in the piston as shown, or alternatively in the cylinder well. A replaceable nylon wear piece 31C is detachable mounted as by two studs on the end wall 31D of the piston 31A.

As will be seen in FIG. 4, the piston 31A is cup-shaped or hollow facing the similarly shaped cylinder 32A and together define a variable volume air chamber AC that can be connected to an air pressure source through an inlet 40. Reciprocal movement of the piston is limited in opposite directions by respective stop members 50 and 60. Movement of the guide block towards the saw blade 10 is limited by stop 50 which includes an adjusting screw 51 threaded into the end wall 31D of the piston, and having a head 52 that engages with a lug member 53 attached to the base 30B of the cylinder by a plurality of studs. Movement of the guide block away from the saw blade, i.e. to the left as viewed in FIG. 4, is limited by stop 60 which consists of a screw 61 threaded through an aperture in the base 30B of the cylinder and having a free outer end 62 aligned for abutment with the head 52 of adjusting screw 51.

From FIG. 4 it will be appreciated only one of a pair of guide units is illustrated in detail and the other one is merely a mirror image thereof, and located on the opposite side of the blade. This latter unit is represented by a portion only of the replaceable nylon guide block 31C' shown on the other side of the saw blade 10.

As previously mentioned, a pair of guide blocks as shown in FIG. 3 or as shown in FIG. 4 are located at the trailing end of the blade and in a fixed predetermined location relative to the blade associated therewith. The guide block is adjustable relative to the blade and positioned so as normally not to be in contact with the blade during smooth running of such blade. During cutting the blade has imposed thereon vibrations and/or bending forces causing the blade to deflect and engage one or the other of the guide blocks. The guide blocks resist the movement through the resilient bias tending to return the blade to its neutral free-running position. The air assembly of FIG. 4 because of the relatively small movable mass has a quick response time for return of the guide block to its initial position after being displaced when engaged by the blade.

While only one pair of combine guide blocks and damper is shown more can, if desired, be associated with each saw blade. For example, a pair of the previously described movable guide blocks can be located at the leading side of the blade as indicated at 70 in FIG. 1. Alternatively, the guide blocks at this position can be conventional fixed blocks.

Figure 5:
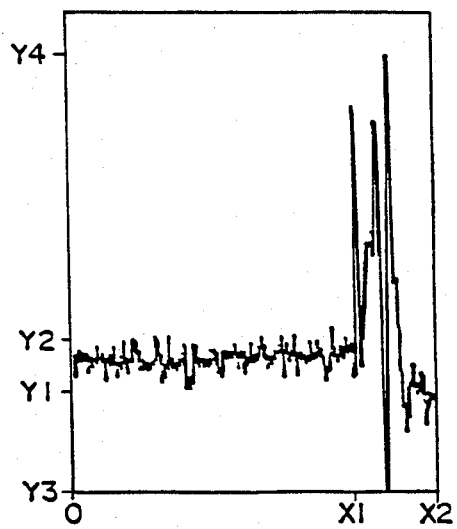
FIG. 5 is a graph illustrating vibration in a blade without use of a damper during cutting.
Figure 6:
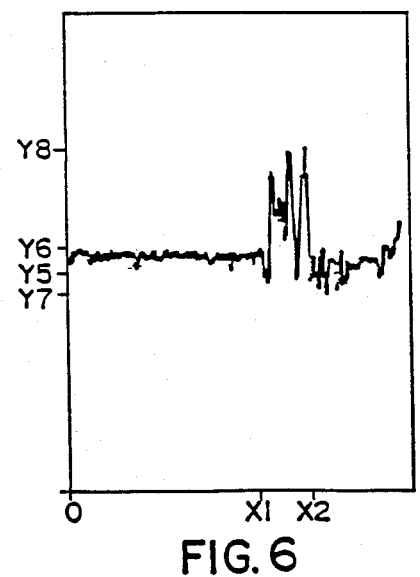
FIG. 6 is a graph to the same scale showing substantial reduced vibration during idle running and cutting with a blade having a damper provided in accordance with the present invention.

FIGS. 5 and 6 are graphs of equal scale wherein FIG. 5 depicts vibration in the range y1–y2 during free running of a blade and within the range y3–y4 during cutting and wherein conventional fixed saw blade guides are used. The free running blade is represented on the portion 0-x1 of the graph and cutting from x1 to x2. Similarly in FIG. 6 the free running blade is represented on the portion of the graph 0-x1, and cutting on the portion x1-x2. Vibration during free running is in FIG. 6 within the range y5 to y6 which is narrow compared to range y1–y2 of FIG. 5 and the range of y7–y8 during cutting. The range of vibration y7–y8 of FIG. 6 is very small compared to the corresponding range y3–y4 of FIG.5 which is illustrative of the effectiveness of the blade guide and damper of the present invention. The narrow range y7–y8 results in a much smoother cut in the wood than is the case with a conventionally guided saw blade and also a lower noise level.

The saw blade guide system is set up initially so that saw guide blocks 31C and 31C' are normally in non-engagement with the saw blade when the latter is running smoothly in a substantially vibration free condition. This normally requires about 0.001 to 0.04" clearance in the static state.

While the saw guide is described herein with reference to gang saws in lumber mills, it is not intended to be, nor necessarily so, limited. The resiliently biased guide, preferably pneumatic, of the present invention also can be used on other power driven saws for example small hand held electric circular saws. In such instance the blade guide damper can be mounted on the pivoted blade guard.

We claim:

1. A guide assembly for a movable saw blade in a sawing system, comprising:
   (a) a pair of guide units;
   (b) a first one of said pair of guide units positioned at a location adjacent a first face of the saw blade;
   (c) a second one of said pair of guide units positioned at a location adjacent a second face of the saw blade and generally opposite to said first guide unit; and
   (d) each of said first and second guide units including:
      (i) a guide block having a face engageable with the corresponding face of the blade;
      (ii) a guide housing having said guide block reciprocally mounted thereon;
      (iii) resilient means urging said guide block on said guide housing in a direction towards the corresponding face of the blade; and
      (iv) means limiting reciprocal movement of said guide block in at least one direction of its reciprocal movement.

2. The saw system of claim 1 wherein said resilient means comprises pneumatic pressure means.

3. The saw system of claim 2 wherein said guide block has a piston portion reciprocal in a cylinder and including stop means limiting reciprocal movement of such block in each of its opposite directions.

4. The saw system as defined in claim 3 including adjustment means permitting selectively adjustably positioning said stop means.

5. A saw comprising a circular saw blade mounted on a power driven shaft and a guide assembly for said blade, said guide assembly comprising a pair of guide units, mounted respectively on each of opposite side faces of the blade at a selected location, each said guide unit comprising a guide housing located adjacent but spaced from a side face of the saw blade, a guide block reciprocally mounted in said housing and having a saw blade engaging portion projecting therefrom in a direction toward the side fce of the saw blade, stop means limiting movement of said guide block such that the latter is normally in non-engagement with the saw blade while the latter is in a smooth substantially vibration free running condition and means resiliently biasing said guide block against said stop means.

6. A saw as defined in claim 5 including a guide assembly as defined at each of the infeed and outfeed sides of the blade.

* * * * *